Patented Dec. 17, 1946

2,412,890

UNITED STATES PATENT OFFICE 2,412,890

PREPARATION OF METAL AMMINE SALTS

Grinnell Jones and Walter Juda, Cambridge, Mass., assignors to Albi Chemical Corporation, New York, N. Y., a corporation of New York No Drawing. Application June 17, 1942, Serial No. 447,471

7 Claims. (Cl. 23—14)

The present invention relates to the preparation of complex metal ammine salts.

By the term "ammine" it is intended to include only ammonia and amines.

Complex metal ammine salts vary widely in chemical structure and also in physical properties, particularly with regard to stability and solubility, depending upon the nature of the metal (and in some cases its state of oxidation), the anion, the conditions of preparation and other factors. For these and other reasons, it is difficult to generalize in this field and to determine in advance either the nature of the final product or the essential or optimum ingredients or procedures to be employed. Our invention provides a practical and flexible procedure by the use of which a wide variety of useful products is obtained as hereinafter disclosed.

Many complex metal ammine salts are extremely soluble in water and for this reason it is very difficult to prepare them in the solid state, in view of the difficulty of precipitating them from the solutions in which they are formed. Attempts to prepare these soluble salts in the solid state by chilling the solutions are often ineffective and give poor yields. Attempts to recover the salt by evaporation of the liquid commonly result in loss of ammonia or of a volatile amine by volatilization. Other complex metal ammine salts which are sparingly soluble are not subject to these difficulties but involve other difficulties in precipitation, filtering, washing and drying.

It has been proposed to form complex metal ammonia salts by exposing the solid metal salts to ammonia gas. However, with this method the formation of the complex salt is apt to be merely superficial and may not penetrate thoroughly into the inner part of the crystals. Thus the conversion to the complex salt may be incomplete.

It has also been proposed to react basic copper carbonate with ammonium carbonate in the dry state to form solid copper ammonia carbonate, the reaction preferably being carried out in the presence of lime to absorb the carbon dioxide which is liberated. It is difficult, however, if not impossible to tell when this reaction has gone to completion, so that the nature of the final product and of solutions prepared therefrom are necessarily somewhat indeterminate. Furthermore, this proposal results in a product of extremely unstable character, which must be shipped and stored in sealed containers.

It is an object of our invention to provide an improved process for the preparation of solid complex metal ammine salts.

A further object is to provide such a method which will be practical and economical for use in large scale manufacture.

Yet another object is to provide a method for producing solid complex metal ammine salts of controlled stability and controlled solubility.

In general, our improved method comprises the dry mixing and agitation of a solid metal compound the anion of which is derived from an acid stronger than carbonic acid, with a solid ammine compound which is relatively unstable and which will form, with the solid metal compound, a complex metal ammine salt. When a source of ammine such as ammonium carbonate, ammonium carbamate, or an amine carbonate, or the like, is used, carbon dioxide is liberated during the mixing and agitation. In some cases color changes characteristic of the metal appear. The mixture becomes wet and in some cases pasty, almost fluid. The solid complex metal compound may be dried after the reaction is complete, or the agitation and drying may be accomplished simultaneously. The product may be ground to any desired particle size.

In an alternate procedure, a metal salt and an ammine compound are mixed with a salt or salts containing an anion which is capable of forming an insoluble salt with one or more of the metal salts, as claimed in our co-pending application Serial No. 447,470, filed June 17, 1942.

In some cases it is desirable to heat the mixture to start the reaction. The heat is preferably moderate, of the order of 70–80° C., although considerable variation in this temperature is permissible according to the ingredients and the final product involved.

Drying can be accelerated by the application of a vacuum.

As indicated above, a wide range of desirable products may be obtained by our invention. The solubility and stability of the final product may be varied in accordance with the requirements of the particular purpose in mind. The chemical composition is also subject to variation in the light of the same considerations.

For a better understanding of our invention, the following specific examples of its application may be given, it being understood that these are illustrative only and are not to be construed in a limiting sense. The proportions are by weight.

Example 1.—20 parts of copper sulfate and 23 parts of ammonium carbonate are mixed in dry crystalline form in a mortar and the mixture is agitated as by stirring. The reaction starts almost immediately and proceeds with the liberation of carbon dioxide and of water. The water of crystallization is partially substituted by $NH_3$. Since the final product appears to have the composition $Cu(NH_3)_4SO_4H_2O$, it is likely that four molecules of water of crystallization are directly substituted by four $NH_3$ groups while the fifth molecule of water of crystallization cannot be replaced.

Since the copper ammonia sulfate is a fairly stable compound, the salt can be dried by heat. A short exposure to a temperature of about 105° C. will dry the product if it is exposed to the heat in thin layers, without decomposing the copper ammonia complex. A continued exposure, however, will slowly decompose the complex, ammonia being given off and the deep blue to violet color of the powder becoming lighter.

Mixing and drying may be facilitated by carrying out the mixing and agitation of the ingredients in a closed container or flask to which a vacuum is applied, the ingredients being heated during the agitation. The evolution of carbon dioxide and of water vapor during the reaction tends to reduce the vacuum but after the reaction has gone to completion, the vacuum will increase and then reach a constant value. This gives a reliable indication of the completion of the desired reaction and the formation of the desired dry product.

For example, in one experiment it was found that when 1 lb. of copper ammonia sulfate was formed in a five litre, three-neck Pyrex flask, under a vacuum which finally went to about 22 millimeters of mercury, the flask being heated in a water bath to approximately 100° C., the reaction was complete in less than one hour.

The product may be ground to any desired particle size.

*Example 2.*—16 parts of sodium fluoride, 45 parts of copper sulfate and 50 parts of ammonium carbonate are dry mixed and agitated together, using the above or any convenient procedure, either with or without the application of vacuum and heating. After the reaction has gone to completion (as indicated by the fact that carbon dioxide is no longer given off), the product may, if desired, be dried by spreading it in thin layers. It may then be ground as previously indicated.

The mixing and drying may be simultaneously accomplished, as in the case of Example 1. For instance, the reaction may be carried out in a flask to which a vacuum is applied during the reaction, the flask being heated in a water bath or otherwise. Evolution of carbon dioxide and water vapor will reduce the vacuum during the progress of the reaction and completion of the reaction will be indicated by decrease in and stabilization of the pressure.

Example 2 is illustrative of a type of procedure in which a first or primary water-soluble metal salt is agitated with an ammonium compound and a second water-soluble salt, the anion of which second salt forms an insoluble salt with the metal of the first or primary metal salt. This process results in a final product which is soluble in water but which, when applied to a fabric, for example, and the ammonia volatilized, will leave upon the fabric a deposit of a water-insoluble metal compound.

The exact nature of the final product of Example 2 is subject to some speculation.

It is possible that the sodium fluoride appears as such in the final product, mixed with copper ammonia sulfate. Or there may be a double decomposition reaction which results in the formation of copper ammonia fluoride and also the formation of sodium sulfate simultaneously with the formation of the complex copper ammonia salt. A third possibility is that both of these reactions may take place to some extent; the final product may be intermediate between the two first indicated, comprising a mixture of copper ammonia sulfate, copper ammonia fluoride, sodium sulfate and sodium fluoride.

In most cases it is immaterial which of these conditions prevails, since in any event the final product will contain ions which, when dissolved, deposited upon a base material such as a fabric and the ammonia volatilized, will leave an insoluble metal compound.

If we assume the final product to be a mixture of copper ammonia sulfate and sodium fluoride, the theoretical amounts of copper, ammonia and fluorine present will be: Cu, 19%, $NH_3$, 20.3% and F, 12%, based on the original amounts of copper sulfate, ammonium carbonate and sodium fluoride given in Example 2. If complete double decomposition takes place and the final product consists of copper ammonia fluoride and sodium sulfate, the relative amounts of copper, ammonia and fluoride in the product still would not be significantly changed from the percentages just given.

If the number of molecules of water of crystallization per molecule of copper ammonia fluoride should be high, the above theoretical percentages of copper, ammonia and fluorine would no longer hold. This, however, seems unlikely, since water is obviously liberated during the reaction.

Analysis of our product prepared in accordance with Example 2 has given figures closely comparable to the theoretical percentages just given.

The complex final product is quite stable. Only one-fifth of the ammonia is lost when the powder is dried for thirty minutes at a temperature of 106° C. If the product is to be used in solution, the loss of ammonia during drying (if any) does not render the product useless, since a small addition of ammonia to the solution will dissolve any residue.

The final composition which contains the theoretical proportions within the limits given above is soluble in water, giving a deep blue solution characteristic of copper ammonia complex compounds. If an excess of water is added, the solution turns to a lighter blue and a turbidity appears which may be due to hydrolysis. A small addition of ammonia, however, clears the solution again and causes the deep blue color to reappear. This indicates that an excess of ammonia is required to obtain stable dilute solutions of copper ammonia compounds.

*Example 3.*—48 parts of copper sulfate and 48 parts of ammonium carbonate are mixed in dry crystalline form in a mortar or in a closed flask as in Example 1 above. The mixture is stirred constantly and when it becomes pasty or fluid, approximately 6.4 parts of a wetting agent (for example an ester of a sulfonated bi-carboxylic acid such as Aerosol M. A.) are added and uniformly distributed throughout the mixture. In the case of solid wetting agents, uniform distribution is facilitated by dissolving said agent in a minimum amount of hot water prior to introducing it into the mixture.

The reaction proceeds to completion as in Example 1 and the product may then be used if desired in the formation of various compositions. For example, an effective fire retarding composition may be made by mixing this product with diammonium phosphate in the proportions of approximately one part of the complex copper ammonia product to ten parts of diammonium phosphate. The resulting mixture will be soluble in water and will have high penetrating and wetting qualities due to the presence of the wetting agent. When impregnated into combustible materials such as wood or fabric, this composition will impart to such material desirable preservative and fireproof properties.

Example 4.—10 parts of cobaltous chloride, 20 parts of ammonium carbonate, and 4 parts of ammonium chloride are mixed and stirred together in the presence of air or other oxidizing agent. The purpose of the oxidizing agent is to convert the cobalt from the cobaltous to the cobaltic state. The reaction goes as above. The mixture becomes moist, carbon dioxide is liberated and the color turns to brown, indicating the formation of a cobaltic ammonia compound. The color of the mixture after drying is red-violet.

The final product contains a sparingly soluble product, probably the chloro pentammonia cobaltichloride, $[Co(NH_3)_5Cl]Cl_2$.

Example 5.—20 parts of copper fluoride and 50 parts of ammonium carbonate are mixed and agitated together as in the preceding examples. The reaction proceeds as above, the final product being, for the greater part, readily soluble in water.

Other insoluble copper salts, for example copper phosphate or copper arsenite, may be used instead of the fluoride in Example 5, but in these cases the reaction proceeds with more difficulty and it is advisable to heat the mixture in order to expedite the reaction.

Example 6.—5 parts of cobaltous chloride, 10 parts of guanidine carbonate, and one to two parts of ammonium chloride are mixed and stirred together in the presence of air or other oxidizing agent, as in Example 4. Oxidation of the cobalt and formation of a complex cobalt guanidine chloride proceeds and the final product is violet-blue in color.

It will be noted that in Examples 4 and 6 the metal is oxidized from the "ous" to the "ic" state during the formation of the complex salt. For maximum efficiency it therefore becomes advisable to furnish an additional supply of the anion of this metal salt. This may be done, as in Examples 4 and 6, by supplying this anion $$\overline{(Cl)}$$

as a part of the source of ammonia. Or some other source of this anion may be provided.

Both the specific ingredients and the relative amounts thereof given in the foregoing examples are subject to wide variation.

In place of the copper sulfate mentioned, salts of cobalt, nickel, silver, zinc, cadmium and others capable of forming complex ammine salts may be used.

In the appended claims, we use the term "ammine complexogen metal" to designate metals which are capable of forming complex metal amine salts or metal ammonia salts, when mixed in the solid state with a solid source of ammine.

As previously indicated, the anions combined with the metals in these salts will be anions derived from acids stronger than carbonic acid. In determining the relative strengths of acids, the dissociation constant is to be taken into consideration, in accordance with well established principles.

It is desirable to avoid metal carbonates as starting materials because, in their absence, the completion of the reaction is indicated when carbon dioxide is no longer liberated. Thus when ammonium carbonate is used as a source of ammonia, the metal salt will be a salt with an anion different from that of the ammonium salt.

We also prefer to avoid the formation of metal ammonia carbonates as final products. For a given metal the carbonate will be less stable than salts containing anions derived from acids stronger than carbonic acid.

In place of ammonium carbonate there may be used ammonium bicarbonate, ammonium carbamate, urea, amine compounds, such as carbonates, for example guanidine carbonate, and the like.

In place of sodium fluoride mentioned in Example 2 there may be used monoammonium phosphate, diammonium phosphate, sodium arsenite, sodium arsenate, or other salt the anion of which will form, with the metal of the first or primary salt, a compound which is relatively insoluble in water. For many purposes, water-soluble salts of this class are preferred.

It is to be noted that salts which are strongly basic or acid are not suitable for admixture as in Example 2 with the primary metal salt and the source of ammine prior to reaction between these ingredients to form the complex metal ammine salt, because the strong alkalinity or acidity imparted thereby would prevent the formation of the complex salt. The ammonia or volatile amine will be driven off from strongly basic mixtures and the complex formation cannot take place in strongly acid media. The compound selected as a third ingredient should, therefore, be one which is substantially neutral.

As previously indicated, the proportions given above are merely convenient examples of operative proportions. The proportions of ingredients usable in our process are subject to wide variation. If it is desired to effect complete conversion of the metal salt to the complex metal ammine compound, sufficient ammonia or amine must obviously be supplied for this purpose.

By our novel process we may prepare solid complex metal ammine salts which are stable at normal temperatures and pressures under ordinary conditions of manufacture, handling and storage. Such stability is possessed, for example, by the products obtained by the procedures given in Examples 1, 2 and 3, above. As illustrated by Example 3, we may produce solid complex metal ammine salts which can be mixed with other ingredients to form products useful for a variety of purposes.

For some uses less stable products may be unobjectionable or even desirable.

Products of varying degrees of solubility, as desired, may be prepared by our process. Thus the process of Example 4 above utilizes an initial mixture of ingredients all of which are readily soluble in water to form a final product which contains a complex metal ammine salt which is only sparingly soluble. In Example 5, on the other hand, the initial metal salt is relatively insoluble in water but the final product is for the greater part readily soluble in water.

It will thus be seen that by our invention there is provided a novel and improved process for the preparation of solid complex metal ammine salts, which process is practical and economical for large scale manufacture and results in a greatly improved yield of desirable products having a wide range of commercial applications.

We claim:

1. A method for the preparation of a solid complex metal ammine salt, which comprises the steps of mixing and agitating together a solid salt of an ammine complexogen metal, said salt having an anion derived from an acid stronger than carbonic acid, and a solid ammine salt which is unstable and which will form, with the solid metal compound, a complex metal ammine salt, continuing said mixing and agitation until the mixture becomes moist and the metal salt is substantially converted into a complex metal ammine salt, and drying the complex salt.

2. A method for the preparation of a solid complex metal ammonia salt, which comprises the steps of mixing and agitating together a solid salt of an ammine complexogen metal, said salt having an anion derived from an acid stronger than carbonic acid, and ammonium carbonate, continuing said mixing and agitation until the metal salt is substantially converted into a complex metal ammonia salt, and drying the complex salt.

3. A method for the preparation of a solid complex metal guanidine salt, which comprises the steps of mixing and agitating together a solid salt of an ammine complexogen metal, said salt having an anion derived from an acid stronger than carbonic acid, and guanidine carbonate, and continuing said mixing and agitation until the metal salt is substantially converted into a complex metal guanidine salt.

4. In a method for the preparation of a solid complex metal ammonia salt, the steps which comprise mixing and agitating together a solid salt of a metal selected from the group consisting of copper, cobalt, and silver, said salt having an anion derived from an acid stronger than carbonic acid, and a solid ammonium compound which is relatively unstable and which will form, with the said metal salt, a complex metal ammonia salt, and continuing said agitation until said salt is substantially converted to a complex metal ammonia salt.

5. A method for the preparation of a solid complex copper ammonia salt, said method comprising mixing and agitating together a solid copper salt which has an anion derived from an acid stronger than carbonic acid, and ammonium carbonate, until the mixture becomes moist and carbon dioxide is evolved, then continuing said agitation until the evolution of carbon dioxide and water vapor substantially ceases, and drying the resulting complex salt.

6. In a method for the preparation of solid complex metal ammonia salts, the steps which comprise mixing, agitating and heating together, in the solid state and under a vacuum, a metal salt selected from the group consisting of those salts of copper, cobalt and silver having an anion derived from an acid stronger than carbonic acid, and a solid ammonium compound which is unstable and which will form, with the solid metal compound, a complex metal ammonia salt, and continuing said agitation until the metal salt is substantially converted into a complex metal ammonia salt.

7. A method for the preparation of a solid complex metal ammonia compound, which comprises the steps of mixing and agitating together a solid salt of an ammine complexogen metal, said salt having an anion derived from an acid stronger than carbonic acid, and a solid ammonium compound which is unstable and which will form, with the metal compound, a complex metal ammonia salt, agitating the mixture until it becomes pasty or fluid, and continuing the agitation until said metal salt is substantially converted into a solid complex metal ammonia compound.

GRINNELL JONES.
WALTER JUDA.